US007907952B2

(12) United States Patent  
Lee et al.

(10) Patent No.: US 7,907,952 B2
(45) Date of Patent: Mar. 15, 2011

(54) METHOD AND APPARATUS FOR SECURING QUALITY OF COMMUNICATION SERVICE TO MOBILE TERMINAL

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 1120 days.

(21) Appl. No.: 10/919,953

(22) Filed: Aug. 16, 2004

(65) Prior Publication Data
US 2005/0042987 A1 Feb. 24, 2005

(30) Foreign Application Priority Data

Aug. 19, 2003 (KR) .................. 10-2003-0057131

(51) Int. Cl.
H04W 72/00 (2009.01)
(52) U.S. Cl. ............... 455/452.2; 455/503; 455/135; 370/332; 370/333
(58) Field of Classification Search ............. 455/433, 455/452.1, 452.2, 454, 463, 503, 80, 560, 455/135, 436, 439, 525, 403, 450; 370/395.21, 370/349, 395.64, 331, 352, 328, 401, 405, 370/332, 333
See application file for complete search history.

(56) References Cited

U.S. PATENT DOCUMENTS

| 5,778,316 | A | 7/1998 | Persson et al. |
| 6,028,851 | A | 2/2000 | Persson et al. |
| 6,259,915 | B1 | 7/2001 | Raith |
| 6,597,911 | B1* | 7/2003 | Kransmo ............... 455/436 |
| 6,725,039 | B1* | 4/2004 | Parmar et al. ........... 455/436 |
| 7,031,708 | B2* | 4/2006 | Sarkkinen et al. ........ 455/436 |
| 2002/0075823 | A1* | 6/2002 | Lee et al. ............... 370/328 |
| 2002/0150085 | A1* | 10/2002 | Flinck et al. ............ 370/352 |
| 2002/0176438 | A1* | 11/2002 | Karjalainen ............. 370/441 |
| 2003/0022683 | A1* | 1/2003 | Beckmann et al. ........ 455/518 |
| 2003/0119536 | A1* | 6/2003 | Hutchison .............. 455/517 |
| 2003/0152028 | A1* | 8/2003 | Raisanen et al. ......... 370/235 |
| 2003/0157952 | A1* | 8/2003 | Sarkkinen et al. ........ 455/522 |
| 2003/0218995 | A1* | 11/2003 | Kim et al. .............. 370/318 |
| 2003/0222819 | A1* | 12/2003 | Karr et al. .............. 342/457 |
| 2004/0101063 | A1* | 5/2004 | Sipila .................. 375/267 |
| 2004/0157640 | A1* | 8/2004 | Pirskanen et al. ....... 455/552.1 |
| 2007/0087698 | A1* | 4/2007 | Lee ..................... 455/69 |

FOREIGN PATENT DOCUMENTS

| CN | 1371579 | 5/2000 |
| EP | 0 986 282 B1 | 9/2002 |
| JP | 2001-292097 | 10/2001 |
| JP | 2001-308784 | 11/2001 |

(Continued)

Primary Examiner — Dominic E Rego
(74) Attorney, Agent, or Firm — Lee, Hong, Degerman, Kang & Waimey

(57) ABSTRACT

A method and apparatus is provided for securing a quality of service of packet data service provided in a communication system by enabling mobile terminals that receive the packet data service in the RRC-idle mode to provide information to the network regarding the quality of the received service. A mobile receiving a specific service, for example MBMS, may provide information related to the quality of the received service or the results of measurements performed to determine the quality of the received service to a network via a common control channel either in response to a measurement request from the network or if the mobile terminal determines that the quality of the received service is below a minimum quality of service to be secured.

40 Claims, 8 Drawing Sheets

FOREIGN PATENT DOCUMENTS

| | | |
|---|---|---|
| JP | 2002-064878 | 2/2002 |
| JP | 2003-500909 | 1/2003 |
| JP | 2003-511925 | 3/2003 |
| KR | 1020030049470 | 6/2003 |
| RU | 2145775 | 2/2000 |
| WO | WO 98/57512 | 12/1998 |
| WO | 99/55112 | 10/1999 |
| WO | 00/67507 | 11/2000 |
| WO | WO 00/70897 | 11/2000 |
| WO | WO 01/26397 A1 | 4/2001 |

* cited by examiner

METHOD AND APPARATUS FOR SECURING QUALITY OF COMMUNICATION SERVICE TO MOBILE TERMINAL

CROSS-REFERENCE TO RELATED APPLICATIONS

This application claims the benefit of the Korean Application No. P2003-057131 filed on Aug. 19, 2003, which is hereby incorporated by reference.

BACKGROUND OF THE INVENTION

1. Field of the Invention

The present invention relates to a method and apparatus for securing a quality of service of packet data service provided in a communication system.

2. Discussion of the Related Art

The universal mobile telecommunications system (UMTS) is a third-generation mobile communications system evolving from the global system for mobile communications system, which is the European standard. The UMTS is aimed at providing enhanced mobile communications services based on the GSM core network and wideband code-division multiple-access technologies.

A conventional UMTS network structure 1 is illustrated in FIG. 1. One mobile terminal 2, or user equipment (UE), is connected to a core network 4 through a UMTS terrestrial radio access network (UTRAN) 6. The UTRAN 6 configures, maintains, and manages a radio access bearer for communications between the UE 2 and core network 4 to meet end-to-end quality-of-service requirements.

The UTRAN 6 includes a plurality of radio network subsystems 8, each of which comprises one radio network controller (RNC) 10 for a plurality of base stations 12, or "Node Bs." The RNC 10 connected to a given base station 12 is the controlling RNC for allocating and managing the common resources provided for any number of UEs 2 operating in one cell. The controlling RNC 10 controls traffic load, cell congestion, and the acceptance of new radio links. Each Node B 12 may receive an uplink signal from a UE 2 and may transmit downlink signals to the UE. Each Node B 12 serves as an access point enabling a UE 2 to connect to the UTRAN 6, while an RNC 10 serves as an access point for connecting the corresponding Node Bs to the core network 4.

Services provided to a specific UE 2 include circuit-switched services, for example voice, and packet-switched services, for example web browsing. In a communication system supporting circuit-switched services, the RNCs 10 are connected to a mobile switching center (MSC) 12 of the core network 4, and the MSC is connected to the gateway mobile switching center (GMSC) 14 managing the access of a voice call requested from or to an external network. Packet-switched services are provided by a serving GPRS support node (SGSN) 16 and a gateway GPRS support node (GGSN) 18 of the core network 4. The GGSN 18 manages a connection to Internet or other external packet-switched networks and the SGSN 16 supports packet communications toward the RNCs 10. An example of a packet-switched service is a multimedia broadcast/multicast service (MBMS), which provides MBMS data from the core network 4 to a UE 2.

The air interface between a UE 2 and the UTRAN 6 includes a radio resource control (RRC) layer (not shown) for the establishment, reconfiguration, and release of radio bearers. A radio bearer is a service providing data transfer between a UE 2 and an RNC 10 of the UTRAN 6 and is established as a point-to-point radio bearer or point-to-multipoint radio bearer according to a radio resource management state, which considers the number of UEs in a cell to be provided with a specific MBMS.

A UE 2 is said to be in the RRC-connected mode when the RRC layer of a UE and the RRC layer of a corresponding RNC 10 are connected, thus providing for a bi-directional transfer of RRC messages. If there is no RRC connection, the UE 2 is said to be in the RRC-idle mode.

When a point-to-multipoint radio bearer is established for a specific service to be provided in a specific cell, the UTRAN 6 directs some of the UEs 2 of the cell to enter the RRC-connected mode and directs the remainder of the UEs to remain in the RRC-idle mode. For example, after having received RRC-connection requests from the UEs 2 intending to receive a specific service via an uplink common control channel, the UTRAN 6 transmits an RRC-connection setup message or an RRC-connection rejection message to the UEs according to the radio resource management state.

UEs 2 receiving the RRC-connection setup message are controlled to receive the corresponding service in the RRC-connected mode and UEs receiving the RRC-connection rejection message are controlled to receive the corresponding service in the RRC-idle mode. A UE 2 having completed an RRC connection to the UTRAN 6 can send a variety of messages according to the control of the UTRAN.

FIG. 2 illustrates a conventional method 50 carried out between the UTRAN 6 and a UE 2 in which an RRC connection is established. The UTRAN 6 receives an RRC connection request (S51) from a corresponding UE 2 requesting an RRC connection for a specific service. In response, the UTRAN 6 transmits an RRC connection setup message (S52) to the UE 2.

The RRC connection is established, thereby setting up a transmission and reception environment per the RRC connection setup message received from the UTRAN 6 and the UE 2 transmits an RRC connection setup complete message (S53) to the UTRAN 6. Thereafter, the UE 2 and UTRAN 6 carry out a predetermined procedure permitting the UE, which is now in the RRC-connected mode, to receive the data of the MBMS (S54).

To more effectively manage the established radio bearer and to secure a minimum quality of service (QoS) for a specific MBMS, the UTRAN 6 transmits a measurement request message requesting the UE 2 to measure the quality of data received from the UTRAN (S55). After measuring the quality of the received data, the UE 2 reports the results to the UTRAN 6 (S56).

The report from the UE 2 enables the UTRAN 6 to adjust variables, such as coding and power levels, allocated for the service. For example, the UTRAN 6 may allocate more transmission power for the MBMS if the report from UE 2 indicates an excessive error rate in the MBMS data or may reduce the power if the report from UE indicates that the signal strength is too high.

The measurement request message informs a UE 2 of how often, or at what interval, to measure a certain parameter to determine the current condition of data transmission and when to report the measurement results to the UTRAN 6. If conditions for reporting the measurement results are met, the UE 2 uses a dedicated control channel to transmit a measurement report (S56) to the UTRAN. The measurement report includes measurement results for a corresponding service.

Any UE 2 having established a point-to-point radio bearer and receiving the corresponding service can provide a measurement report to the UTRAN 6. However, if a point-to-multipoint radio bearer is established, UEs 2 are selectively RRC-connected based on the availability of a dedicated control channel. Therefore, a UE 2 can provide the UTRAN 6 with feedback information, for example QoS information based on the received data packet, only if an RRC connection to the UTRAN 6 is established.

When an MBMS is provided within a cell via a point-to-multipoint radio bearer, a UE 2 receiving service data in the RRC-idle mode has no RRC connection and, therefore, may not be instructed to perform measurements of the quality of received data or provide a corresponding measurement report to the UTRAN 6. Therefore, an RRC-idle UE 2 may be provided with the service from the UTRAN 6, but is unable to inform the UTRAN if the quality of the service is poor and may be unable to secure a minimum quality of service.

Therefore, there is a need for a method and apparatus for enabling a mobile terminal receiving a service in the RRC-idle mode to provide information regarding the quality of the service received to the network. The present invention addresses these and other needs.

SUMMARY OF THE INVENTION

The present invention is directed to a method and apparatus for securing a quality of service of packet data service provided in a communication system. Specifically, the invention is directed to a method and apparatus that enables a mobile terminal receiving a packet data service in the RRC-idle mode to provide information regarding the quality of the service received to the network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method and apparatus that provides a minimum quality of service to a mobile terminal receiving a specific communication service in an RRC-idle mode when providing the specific communication service to a plurality of mobile terminals via a downlink common channel in a radio communication system providing packet data services.

In one aspect of the present invention, a method of communicating quality of service information related to a service in a wireless communication system is provided. The method includes receiving data from a network via a common traffic channel, measuring the quality of service of the data received via the common traffic channel and transmitting a measurement result parameter to the network via a control channel in response to measurement of the quality of service of the data received via the common traffic channel.

It is contemplated that the common traffic channel may be a point-to-multipoint traffic channel. It is further contemplated that the control channel may be a common control channel. Moreover, it is contemplated that the service may be a point-to-multipoint service.

It is contemplated that the method may include receiving a measurement request from the network to measure the quality of service of the data received via the common traffic channel and that the measurement request may include a measurement parameter. Preferably, the measurement parameter includes a measurement mode and/or a measurement object and the measurement mode may be associated with a reporting period It is contemplated that the method may be performed while an idle mode is sustained. Preferably, the idle mode is sustained when there is no dedicated control signal link with the network.

It is contemplated that the measurement result parameter may be transmitted to the network either on a periodic basis and/or in response to an event trigger. Preferably, the event trigger occurs upon satisfying a condition set by the network.

It is contemplated that the measurement result parameter may be transmitted to the network when a connection with the network is initiated. It is further contemplated that a transmission cause may be transmitted with the measurement result parameter to indicate whether the network connection was initiated in order to receive another non-MBMS service or only to transmit the measurement result parameter.

In another aspect of the present invention, a method of communicating quality of service information related to a service in a wireless communication system is provided. The method includes transmitting data via a common traffic channel to at least one mobile terminal and receiving a measurement result parameter from the mobile terminal via a control channel in response to measurement of the quality of service of the data transmitted via the common traffic channel.

It is contemplated that the common traffic channel may be a point-to-multipoint traffic channel. It is further contemplated that the control channel may be a common control channel. Moreover, it is contemplated that the service may be a point-to-multipoint service.

Preferably, the method is performed while the mobile terminal is in an idle mode. It is contemplated that the method may include transmitting a measurement request to the mobile terminal to request the measurement of the quality of service of the data received via the common traffic channel and that the measurement request may include a measurement parameter. Preferably, the measurement parameter includes a measurement mode and/or a measurement object and the measurement mode may be associated with a reporting period It is contemplated that the measurement result parameter may be received from the mobile terminal either on a periodic basis and/or in response to an event trigger. Preferably, the event trigger is a condition set by the network.

It is contemplated that the measurement result parameter may be received when the mobile terminal initiates a connection with the network. It is further contemplated that a transmission cause may be received with the measurement result parameter and processed to determine if the network connection was initiated in order to request another non-MBMS service or only to transmit the measurement result parameter and either a connection setup message or a connection reject message may be transmitted.

In another aspect of the present invention, a mobile communication device is provided for communicating quality of service information related to a service in a wireless communication system. The mobile communication device includes an RF module, an antenna, a keypad, a storage unit, a display and a processing unit.

The antenna and RF module receive data from a network and transmit a measurement result parameter related to a quality of service of the received data to the network. The keypad allows a user to enter information. The display conveys information to the user. The storage unit stores the measurement result parameter related to the quality of service of the received data. The processing unit performs the methods of the present invention to receive the data via a common traffic channel, to measure the quality of service of the data received via the common traffic channel in order to generate a measurement result parameter and to transmit the measurement result parameter to the network via a control channel.

In another aspect of the present invention, a network is provided for communicating quality of service information related to a service in a wireless communication system. The network includes a transmitter, a receiver, and a controller.

The transmitter transmits data to at least one mobile terminal. The receiver receives a measurement result parameter from the mobile terminal. The controller performs the methods of the present invention to transmit the data via a common traffic channel and receive the measurement result parameter via a control channel in response to measurement of the quality of service of the data transmitted via the common traffic channel.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
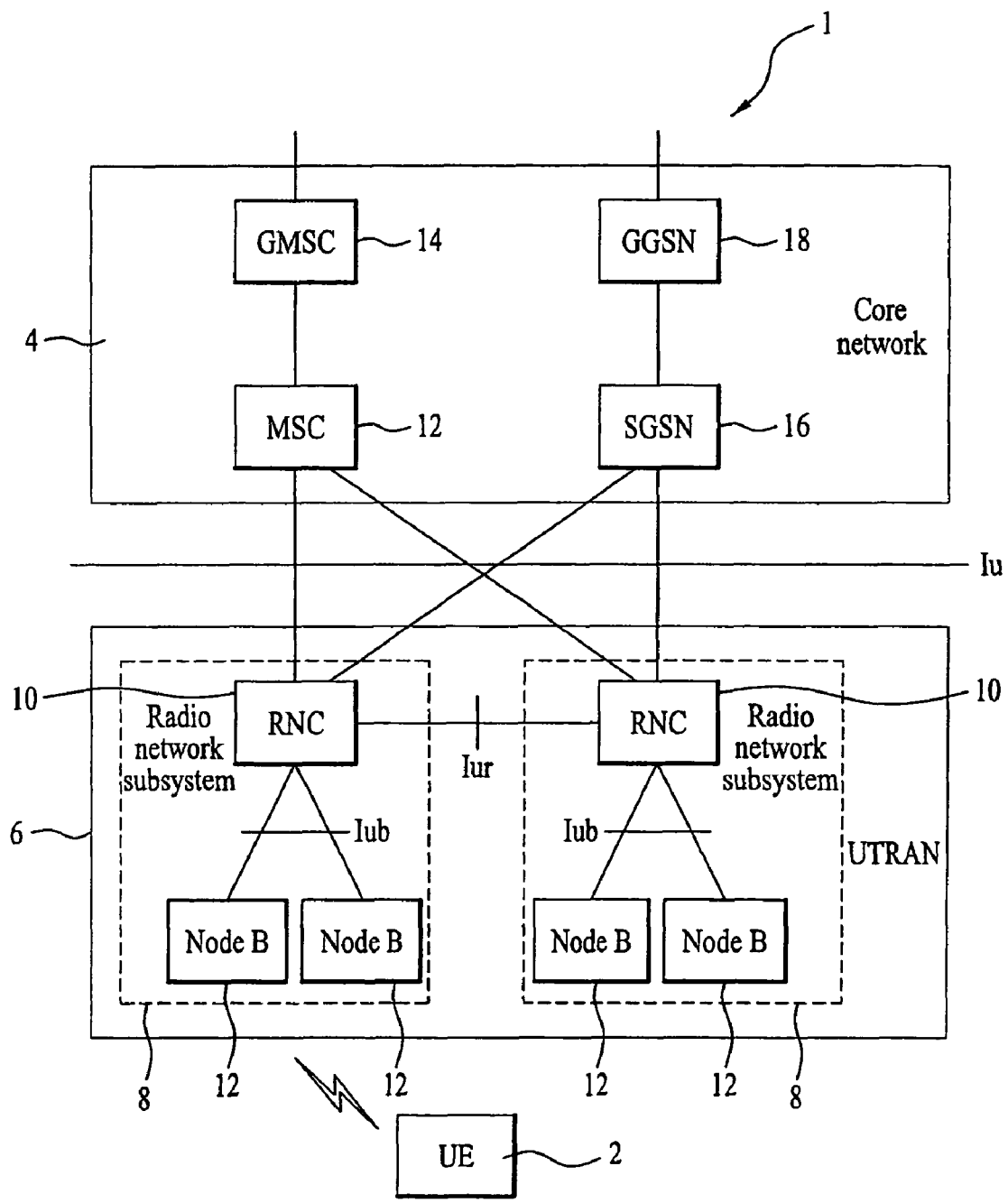
FIG. 1 illustrates a block diagram of a conventional UMTS network structure.
Figure 2:
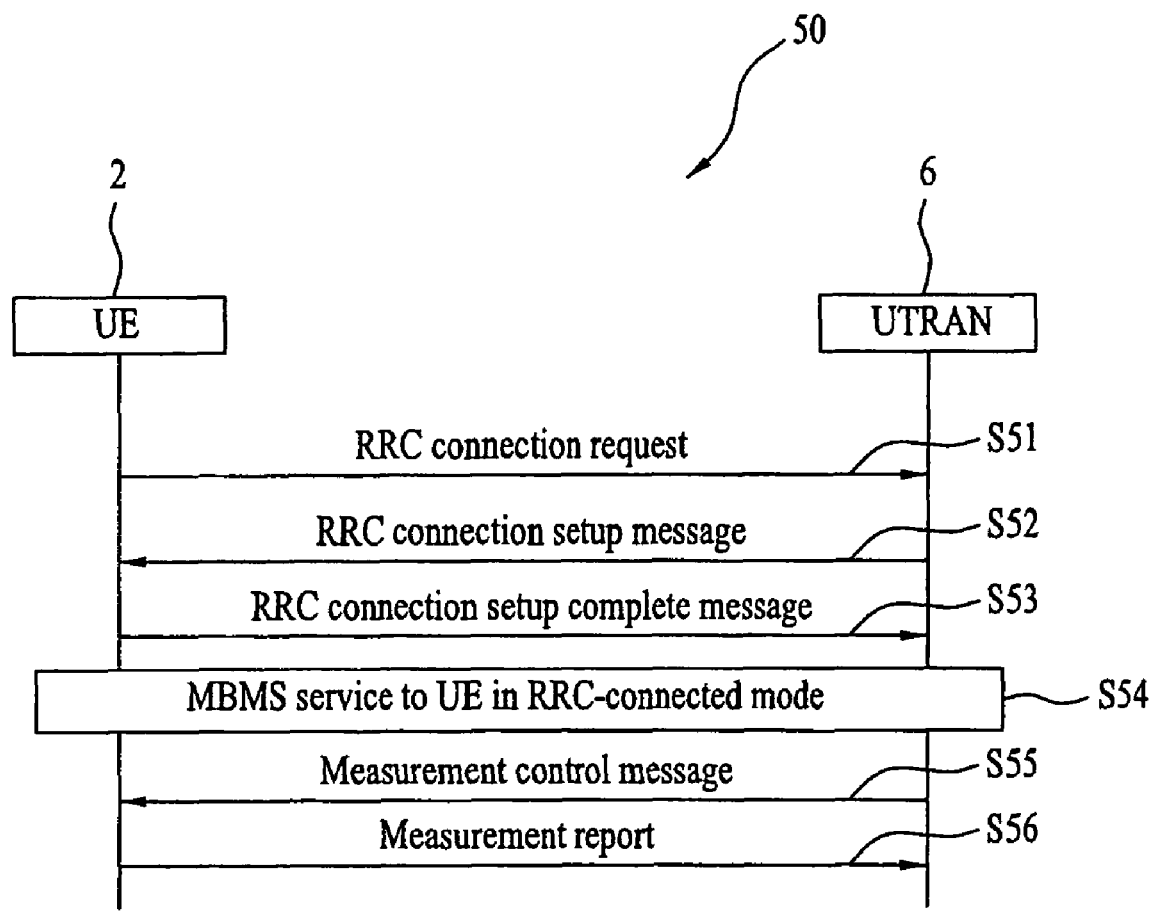
FIG. 2 illustrates a conventional method in which the UTRAN receives a reception state feedback from the UE.

The present invention relates to a method and apparatus for securing a quality of service of packet data service provided in a communication system by enabling mobile terminals that receive the packet data service in the RRC-idle mode to provide information to the network regarding the quality of the received service. Although the present invention is illustrated with respect to a mobile terminal, it is contemplated that the present invention may be utilized anytime it is desired to secure a quality of service of packet data service provided in a communication system in which some of the communication devices to which the service is provided are in an idle mode that precludes the devices from providing information to the network regarding the quality of the received service.

Reference will now be made in detail to the preferred embodiments of the present invention, examples of which are illustrated in the accompanying drawings. Wherever possible, the same reference numbers will be used throughout the drawings to refer to the same or like parts.

The present invention is characterized in that a communication system providing a packet data service, for example an MBMS, to a plurality of mobile terminals 2, or UEs, secures a minimum quality of service for mobile terminals receiving the packet data service in an RRC-idle mode. The present invention is also applicable to packet data services other than MBMS. If a point-to-multipoint radio bearer is established for a specific service, the present invention facilitates securing a quality of service for each UE 2 among a plurality of UEs intending to receive the specific service, including UEs in the RRC-idle mode.

In the present invention, a system side or network, for example a UTRAN 6, provides measurement control information to UEs 2 in an idle mode via a downlink common control channel in order to more effectively receive results of measurements performed by UEs in the idle mode. The measurement control information may include a measurement related parameter indicating how a UE 2 in the idle mode is to perform measurements, which measurements to perform, and when the UE informs the UTRAN 6 of a specific measurement result.

For example, the UTRAN 6 may request a report from a UE 2 via the measurement control information if an error rate of a data block received by the UE exceeds an acceptable limit. The requested measurement may determine whether the strength of a received signal is greater or smaller than a predetermined value.

The measurement control information is provided via a measurement control message. When the UTRAN 6 generates the measurement control message, quality of service information for a specific service that is transferred from a core network 4 via a "session start" is utilized. Specifically, the UTRAN 6 calculates information related to a minimum quality of service to be secured for a specific service based on the quality of service information transferred from the core network 4, generates the measurement control message including measurement control information based on the calculation, and transmits the measurement control message to UEs 2.

If a UE 2 in an idle mode receives the specific service with a quality inferior to the minimum quality of service, the UE uses an uplink common control channel to transmit quality state information for the received service to the UTRAN 6, for example in a measurement report message. The UTRAN 6 controls radio resources based on the quality state information received from the UE 2 in order to secure the minimum quality of service for the UEs in the idle mode.

Since congestion of an uplink channel may increase if UEs 2 frequently transmit measurement report messages to the UTRAN 6, the UTRAN provides the UE with parameters related to the performance of measurements and conditions related to the transmission of measurement report messages. The parameters may include a timer value indicating a minimum interval between transmissions of measurement report messages, a probability value to transfer a measurement report message, and a back-off time value.

For example, having received a probability value, for example 0~1, that a measurement report message will be transmitted and the back-off time value, a UE 2 that intends to transfer a measurement report message generates an arbitrary number, for example 0~1. The UE 2 transmits the measurement report message only if the generated number is smaller or greater than the received probability value. If the measurement report message is not transmitted due to the generated number, the UE 2 generates another arbitrary number after a time according to the received back-off time, compares the new arbitrary number to the received probability value, and again determines whether to transmit a measurement report message.

In the present invention, a UE 2 that is receiving a specific MBMS in an idle mode measures a quality of the MBMS data provided from a UTRAN 6 and transmits the measured quality information to the UTRAN 6 via an uplink common control channel. Specifically, if the UE 2 receives measurement control information from the UTRAN 6, the UE utilizes the measurement control information to measure a quality of the service being provided and transmits the measurement result to the UTRAN 6 via an uplink common control channel if the measured result meets a condition set for transmitting measurement result information.

Even if the UE 2 fails to receive the measurement control information or the measurement control information is not transmitted from the UTRAN 6, the UE may still transmit the measured quality information to the UTRAN 6 indicating that the quality of a received service is poor via an uplink common control channel. The UE 2 may determine that the quality of the received service is poor and transmit the measured quality information without the UTRAN 6 requesting the measured quality information.

A UE 2 in the idle mode may immediately transmit to the UTRAN, via an uplink common control channel, the measured quality information related to the service or information related to a measurement of the quality of the service when a condition for transmitting such information is met. Therefore, quality of the service may be quickly indicated and a minimum quality of the received service may be effectively secured.

On the other hand, instead of immediately transmitting quality information related to the service or information related to a measurement of the quality of the service to the UTRAN 6, the UE may transmit the information upon establishing an RRC connection to the UTRAN. UEs 2 in the idle mode individually transmit the quality information or measurement results via an uplink common control channel, thereby reducing the periodically increased load of the uplink common control channel.

Figure 3:
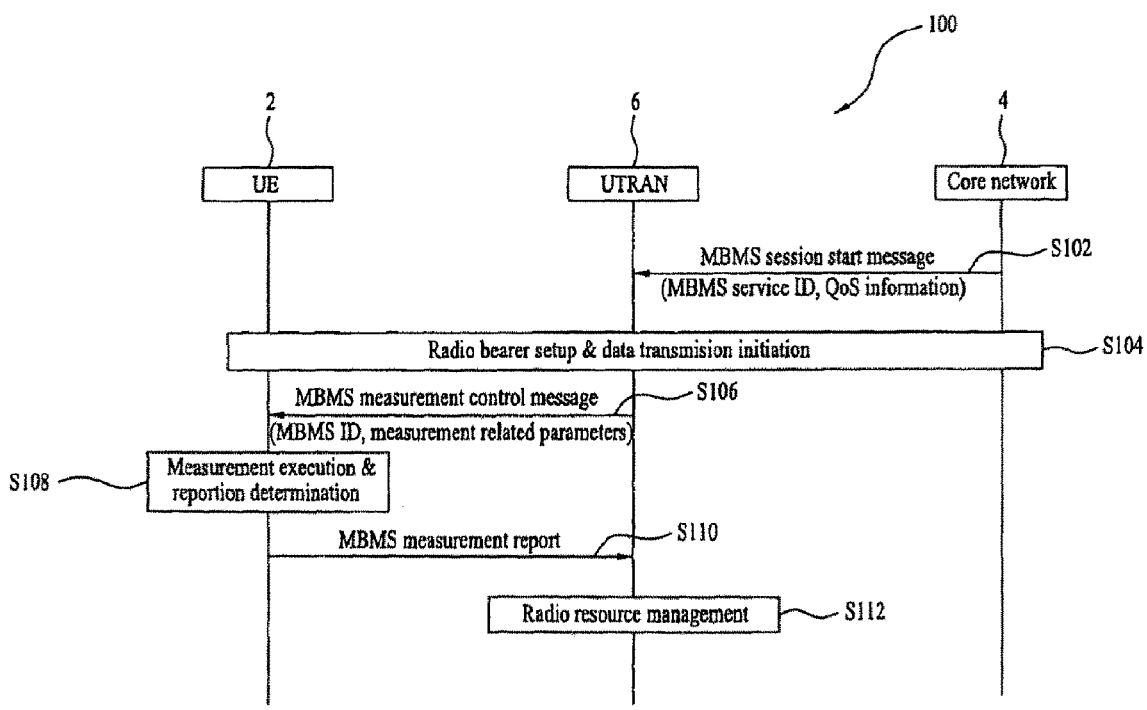
FIG. 3 illustrates a method of securing quality of service according to a first embodiment of the present invention.

FIG. 3 illustrates a method 100 of securing a quality of service according to a first embodiment of the present invention. The method 100 enables a UTRAN 6 to receive a measurement result related to a quality of service received by a UE 2 in an idle mode and to perform radio resource management accordingly.

Referring to FIG. 3, the UTRAN 6 receives an MBMS session start message from a core network 4 (S102). The core network 4 includes a service identifier (ID) of a specific MBMS and quality of service (QoS) information related to the service in the MBMS session start message. The service identifier (ID) of the specific MBMS is included in each message delivered between the UE 2, UTRAN 6, and core network 4 to identify the service with which the messages are associated.

The UTRAN 6, having received the MBMS session start message from the core network 4, transmits an MBMS notification message to a plurality of UEs 2 within a cell in order to notify the UEs that data transmission of the specific MBMS is imminent. The UTRAN 6 performs the MBMS notification and a counting function, establishes a radio bearer for providing the MBMS, and initiates transmission of MBMS data to the UEs 2 within the cell (S104).

The UTRAN 6 performs the counting function, via the MBMS notification, to determine the number of UEs 2 desiring to receive the specific MBMS within a cell. The counting function is utilized to determine whether to establish a radio bearer providing the specific MBMS as point-to-multipoint or point-to-point.

The UTRAN 6 internally sets a threshold to select an MBMS radio bearer. If the number of UEs 2 desiring to receive the specific MBMS within the cell is smaller than the threshold, the UTRAN 6 establishes a point-to-point MBMS radio bearer. If the number of UEs 2 desiring to receive the specific MBMS within the cell is greater than the threshold, the UTRAN 6 establishes a point-to-multipoint MBMS radio bearer.

If a point-to-point radio bearer is established for a specific service, all UEs 2 desiring to receive the specific service enter an RRC-connected mode. However, if a point-to-multipoint radio bearer is established for the specific service, it is not necessary for all UEs 2 desiring to receive the specific service to be in an RRC-connected mode since UEs 2 in the idle mode may receive the specific service through the point-to-multipoint radio bearer.

Subsequent to initiating transmission of MBMS data, the UTRAN 6 transmits a measurement control message for the service, for example an MBMS measurement control message, to the UE 2. The MBMS control message may be transmitted via an MBMS control channel, such as MCCH, or a broadcast control channel, such as BCCH, together with the MBMS data (S106). The MBMS measurement control message includes measurement related parameters and may instruct the UE 2 to perform a certain measurement of a certain item at a certain interval and inform the UE when to transmit the measurement result to the UTRAN 6.

For example, the UTRAN 6 may transmit an MBMS measurement control message instructing a UE 2 to measure strength of a received signal of a specific MBMS and to perform the measurement in each frame. The MBMS measurement control message may further instruct the UE 2 to transmit the measured information when a certain amount of time has passed with the strength of the received MBMS data signal remaining at a level below a specific value.

Therefore, the measurement control message provides various types of information required for the UE 2 to perform measurements related to the quality of the received service. Furthermore, the measurement control message may instruct the UE 2 to transmit a measurement result if a measurement value meets a certain condition while the UE performs the measurement of the received service.

The UTRAN 6 utilizes the quality of service (QoS) information provided by the core network 4 via the MBMS session start message and/or considers the UTRAN radio resource configuration in order to configure, or generate, the measurement control message and measurement related parameters. The UTRAN 6 informs the UE 2, via the measurement control message, regarding a minimum quality of service to be secured.

The UE 2, having received the measurement control message, performs the requested measurement on the received service according to the information contained in the measurement control message and determines whether to transmit the measurement result (S108). Specifically, the UE2 checks whether a condition necessary for transmitting the measurement result to the UTRAN 6 is met.

If the condition for transmitting the measurement result is met, the UE 2 transmits a measurement report message including the measurement result for the received service to the UTRAN 6 (S110). If the condition for reporting is not met, the UE2 does not transmit a measurement report message to the UTRAN 6. A UE 2 that is receiving the MBMS in an idle mode transmits the measurement report message, including the measurement result, to the UTRAN 6 via an uplink common control channel.

If the information in the measurement control message regarding the minimum quality of service to be secured by the UTRAN 6 is received, the UE 2 compares a quality of the service received to the minimum quality of service to be secured. If the quality of the service received by the UE 2 is inferior to the minimum quality of service to be secured, the UE reports to the UTRAN. For example, the UE 2 may report to the UTRAN 6 regarding an error rate of data blocks received.

The UTRAN 6 utilizes the measurement result information included in the measurement report message to manage radio resources (S112). For example, the UTRAN 6 may raise the power allocated to the service if the measurement result information indicates that the received service is of poor quality.

Figure 4:
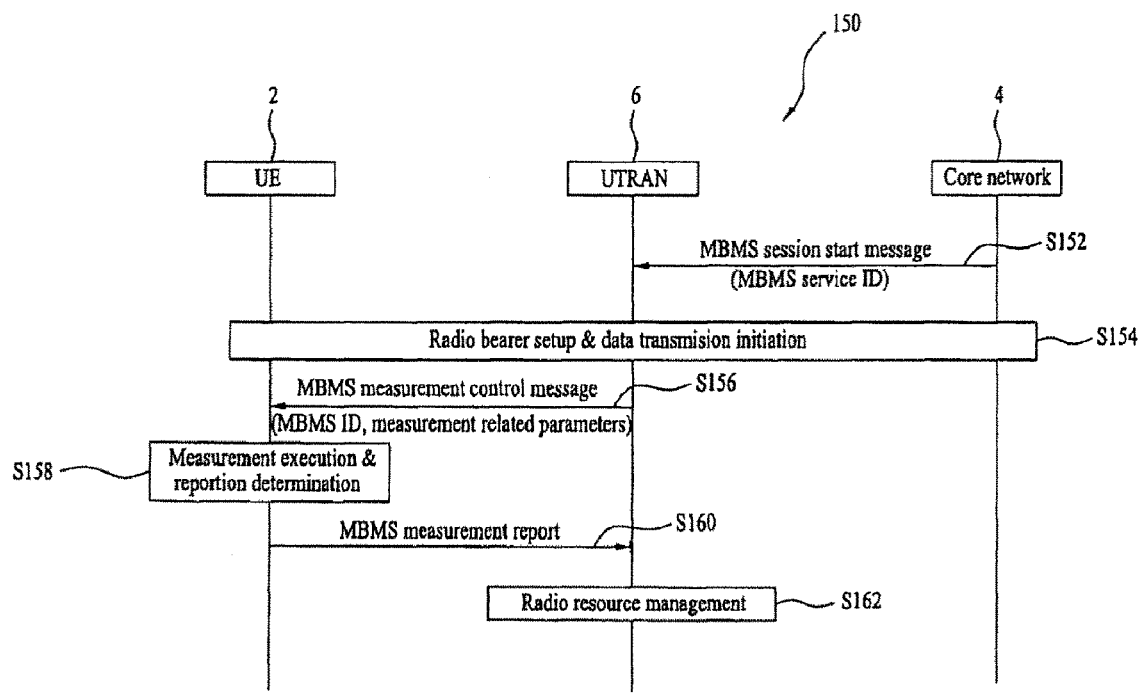
FIG. 4 illustrates a method of securing quality of service according to a second embodiment of the present invention.

FIG. 4 illustrates a method 150 of securing a quality of service according to a second embodiment of the present invention. The method 150 differs from the first embodiment in that the core network 4 does not include quality of service (QoS) information related to the service in the MBMS session start message (S152). Therefore, the UTRAN 6 considers the UTRAN radio resource configuration in order to configure, or generate, the measurement control message and measurement related parameters (S156).

Figure 5:
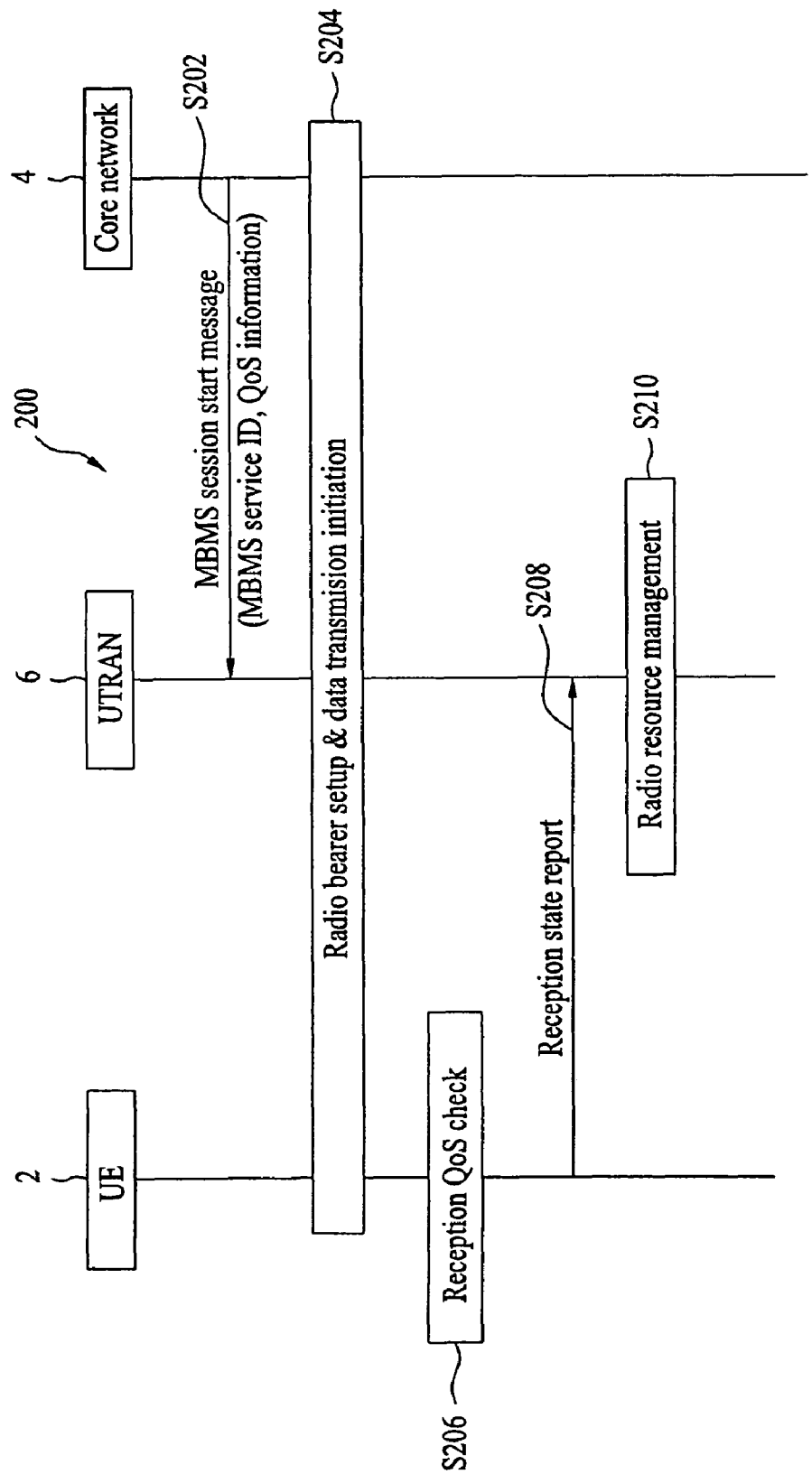
FIG. 5 illustrates a method of securing quality of service according to a third embodiment of the present invention.

FIG. 5 illustrates a method 200 of securing a quality of service according to a third embodiment of the present invention. The method 200 facilitates securing a quality of service of a specific service provided to an idle-mode UE 2 when the UTRAN 6 does not provide information required for measuring the quality of the specific service.

Referring to FIG. 5, the UTRAN 6 receives an MBMS session start message from a core network 4 (S202). The core network 4 includes a service identifier (ID) of a specific MBMS and quality of service (QoS) information related to the service in the MBMS session start message.

The UTRAN 6, having received the MBMS session start message from the core network 4, transmits an MBMS notification message to a plurality of UEs 2 within a cell in order to notify the UEs that data transmission of the specific MBMS is imminent. The UTRAN 6 performs the MBMS notification and a counting function, establishes a radio bearer for providing the MBMS, and initiates transmission of MBMS data to the UEs 2 within the cell (S204).

The UTRAN 6 performs the counting function, via the MBMS notification, to determine the number of UEs 2 desiring to receive the specific MBMS within a cell. The counting function is utilized to determine whether to establish a radio bearer providing the specific MBMS as point-to-multipoint or point-to-point.

The UTRAN 6 internally sets a threshold to select an MBMS radio bearer. If the number of UEs 2 desiring to receive the specific MBMS within the cell is smaller than the threshold, the UTRAN 6 establishes a point-to-point MBMS radio bearer. If the number of UEs 2 desiring to receive the specific MBMS within the cell is greater than the threshold, the UTRAN 6 establishes a point-to-multipoint MBMS radio bearer.

The UE 2 keeps checking the reception quality of received service (S206). If it is determined that the reception quality of the received service is poor, the UE 2 transmits a reception state report message including the determined reception quality state to the UTRAN 6 via an uplink common control channel (S208).

For example, the UE 2 may transmit a reception state report message to the UTRAN 6 indicating the reception quality state as a data block error rate or strength of a reception signal of the received MBMS. When performing the reception quality check for the received MBMS, the UE 2 may determine that a quality of service is poor if errors frequently occur in data blocks received for a predetermined time, if errors in data blocks exceed a predetermined number, or if the reception signal strength of the received service is lower than a predetermined level.

The UTRAN 6 utilizes the reception quality state information included in the reception state report message to manage radio resources (S210). The UTRAN 6 manages radio resources to secure a minimum quality of service for UEs 2.

In the first, second and third embodiments of the present invention, the UE 2 may immediately send the measurement report message or the reception state report message including, respectively, the measurement result information for the received service or the reception quality state information to the UTRAN 6 via the uplink common control channel. On the other hand, the UE 2 may not immediately send the measurement report message or the reception state report message to the UTRAN 6, but rather may send the measurement result information for the received service or the reception quality state information to the UTRAN upon establishing an RRC connection with the UTRAN for a service other than MBMS, for example voice service. For example, while receiving an MBMS, the UE 2 may include the measurement result information for the received service or the reception quality state information in an RRC connection request message and then transmit the RRC connection request message via an uplink common control channel when accessing the UTRAN 6 to receive a voice call.

Figure 6:
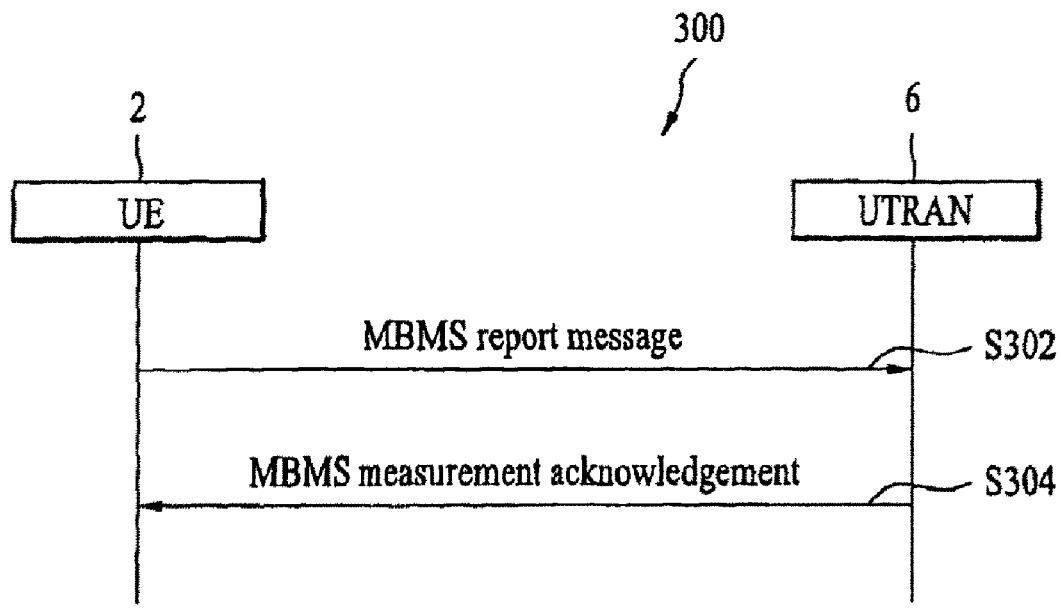
FIG. 6 illustrates a method of the present invention in which a UE transmits a report message to the UTRAN immediately upon performing a quality of service measurement.
Figure 7:
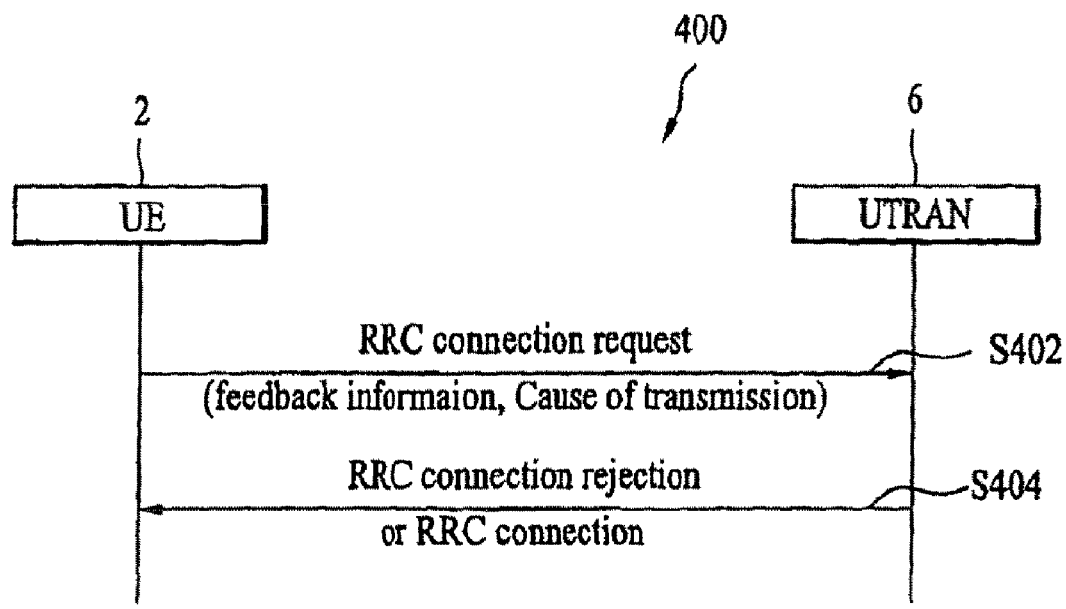
FIG. 7 illustrates a method of the present invention in which a UE transmits a report message to the UTRAN upon initiating a connection with the UTRAN.

FIG. 6 illustrates a method 300 by which a UE 2 immediately transmits an MBMS report message, such as a measurement report message or reception state report message to the UTRAN 6. FIG. 7 illustrates a method 400 by which a UE 2 transmits a report message, such as a measurement report message or reception state report message, to UTRAN 6 via the message used to request an RRC connection, for example an RRC connection request message.

As illustrated in FIG. 6, a UE 2 in RRC-idle or RRC-connected mode transmits a report message, such as a measurement report message or a reception state report message, to the UTRAN 6 using a dedicated message via a common control channel or a dedicated control channel. Referring to FIG. 6, the UE 2 transmits feedback information, such as quality information for the specific service received or information related to the result of measuring the quality of the received service, to the UTRAN 6 as part of a message dedicated to MBMS, for example an MBMS report message (S302).

A service identifier (ID) of the specific MBMS is included in the MBMS report message. The MBMS report message may include the result of measurements performed, for example, according to an MBMS measurement control message transmitted by the UTRAN 6 or information indicating the reception quality state of the specific service, for example, if the UE 2 receives specific service data having excessive errors for a considerable time.

The UTRAN 6 acknowledges that the MBMS report has been received, for example by transmitting an MBMS measurement acknowledgment (S304). Thereafter, the UTRAN 6 manages radio resources by utilizing the information, such as reception quality state or measurement result for the service, received from the UE 2. The step in which the UTRAN 6 informs the UE of the reception acknowledgement may be omitted.

Referring to FIG. 7, if a point-to-multipoint radio bearer is established for a specific service in a cell, the UTRAN 6 controls a portion of UEs in the cell to enter an RRC-connected mode in consideration of radio resources maintained by the UTRAN and the rest of the UEs in the cell remain in an RRC-idle mode. Specifically, when receiving RRC connection request messages via an uplink common control channel from UEs 2 desiring to receive the specific service, the UTRAN transmits an RRC connection setup message to a predetermined number of UEs to receive the corresponding service in the RRC-connected mode in consideration of radio resources maintained by UTRAN. By transmitting an RRC connection reject message to the rest of the UEs 2, the UTRAN 6 controls the rest of the UEs to receive the corresponding service in the idle mode.

As illustrated in FIG. 7, the UE 2 transmits quality information for the specific received service or information related to measurements of the quality of the received service to the UTERAN 6 by including the information in an RRC connection request (S402). The method 400 represents an extended use of the RRC connection request.

The method 400 illustrated in FIG. 7 is not utilized when the UE 2 immediately transmits feedback information, such as quality information for the specific received service or information related to measurements of the quality of the received service. Rather, the method 400 illustrated in FIG. 7 may be utilized when the UE establishes an RRC connection with the UTRAN 6 in order to receive another service other than an MBMS while receiving the MBMS.

The UE 2 includes the reception quality state information for the specific received service or the result of measurements of the quality of the service in an RRC connection request message transmitted to the UTRAN 6. A service identifier (ID) of the specific MBMS is included in the RRC connection request message.

The RRC connection request message may also be utilized only to transmit feedback information when the UE 2 is not attempting to receive another service. The UE 2 transmits an RRC connection request message including a cause of transmission, or reason for transmitting the message. If the feedback information is included in the RRC connection request message and if the cause of transmission indicates that the UE does not request the RRC connection in order to receive another service, the UTRAN 6 transmits an RRC connection reject message to the UE to indicate that the feedback information was received (S404).

On the other hand, if the UE 2 requests the RRC connection in order to receive a service other than MBMS, the UTRAN 6 transmits an RRC connection setup message or an RRC connection reject message to the UE in consideration of the radio resource maintained by the UTRAN (S404).

Figure 8:
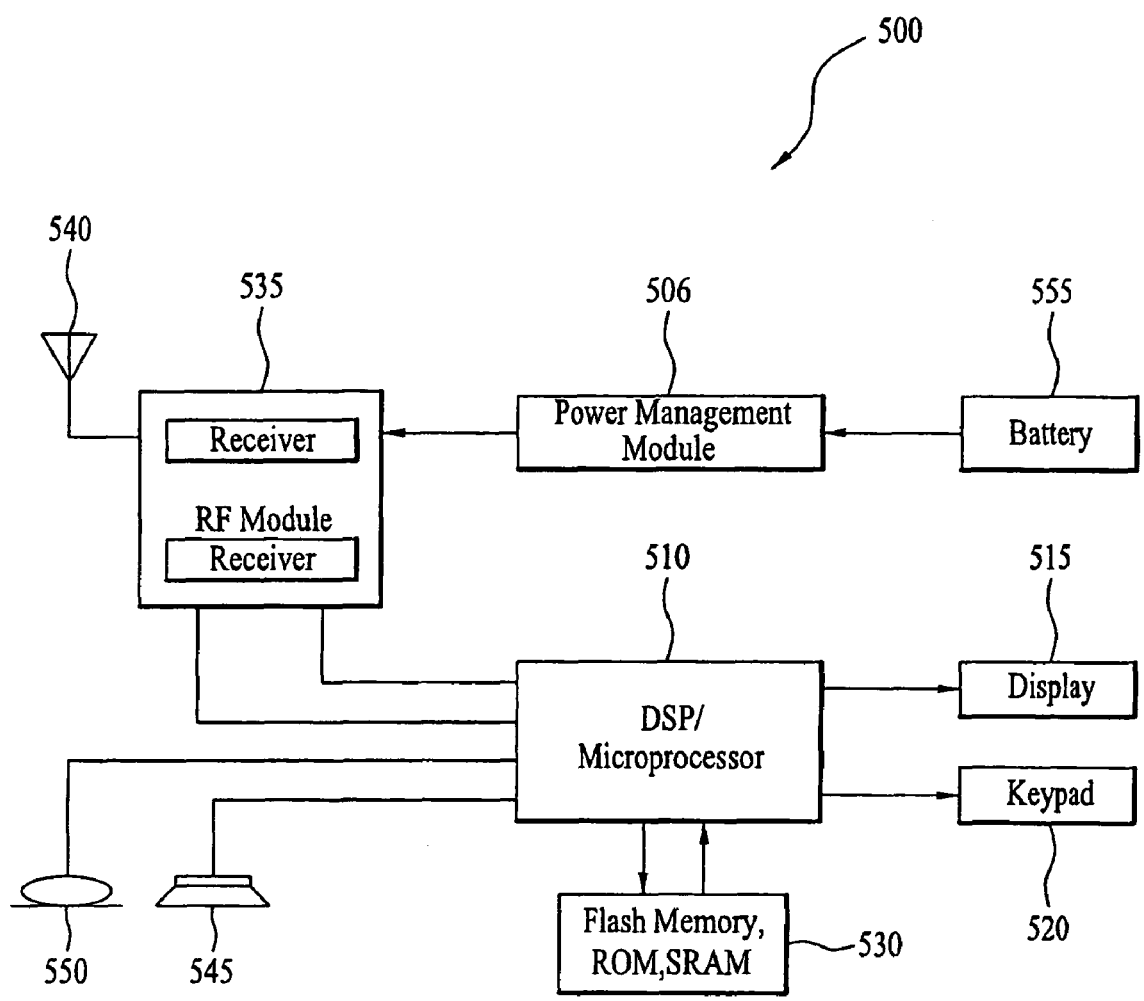
FIG. 8 illustrates a mobile communication device for receiving a service from a network according to one embodiment of the present invention.

Referring to FIG. 8, a block diagram of a mobile communication device 500 of the present invention is illustrated, for example a mobile phone for performing the methods of the present invention. The mobile communication device 500 includes a processing unit 510 such as a microprocessor or digital signal processor, an RF module 535, a power management module 505, an antenna 540, a battery 555, a display 515, a keypad 520, a storage unit 530 such as flash memory, ROM or SRAM, a speaker 545 and a microphone 550.

A user enters instructional information, such as a telephone number, for example, by pushing the buttons of the keypad 520 or by voice activation using the microphone 550. The processing unit 510 receives and processes the instructional information to perform the appropriate function, such as to dial the telephone number. Operational data may be retrieved from the memory unit 530 to perform the function. Furthermore, the processing unit 510 may display the instructional and operational information on the display 515 for the user's reference and convenience.

The processing unit 510 issues instructional information to the RF module 535, to initiate communication, for example, by transmitting radio signals comprising voice communication data. The RF module 535 includes a receiver and a transmitter to receive and transmit radio signals. The antenna 540 facilitates the transmission and reception of radio signals. Upon receiving radio signals, the RF module 535 may forward and convert the signals to baseband frequency for processing by the processing unit 510. The processed signals may be transformed into audible or readable information output, for example, via the speaker 545.

The RF module 535 is adapted to receive data from a network 4 and to transmit a measurement result parameter related to the quality of service to the network. The storage unit 530 is adapted to store the measurement result parameter related to the quality of service. The processing unit 510 is adapted to receive the data via a traffic channel, perform quality of service measurements on the data received via the traffic channel in order to generate a measurement result parameter and to transmit the measurement result parameter to the network via a control channel.

Figure 9:
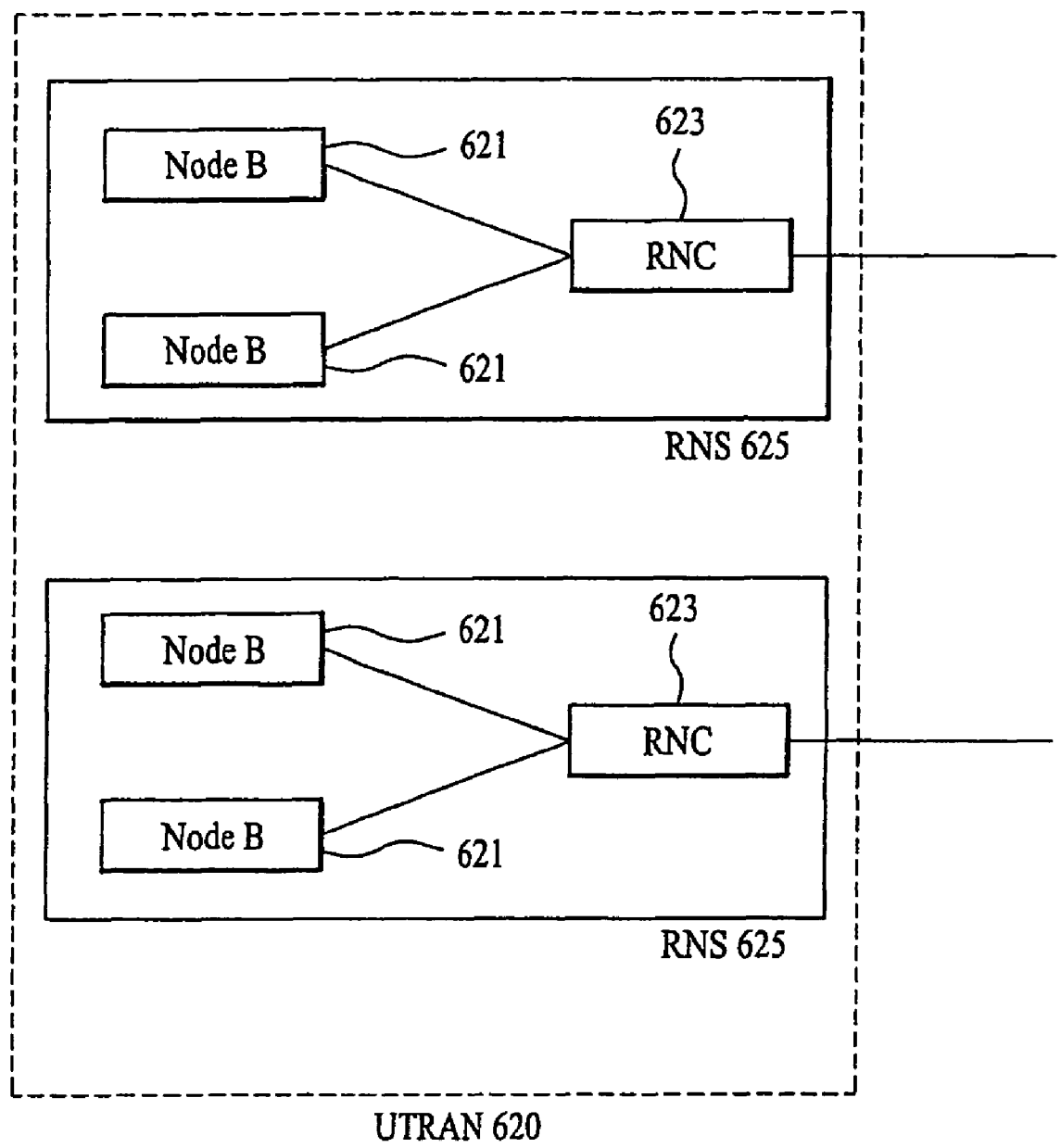
FIG. 9 illustrates a network for transmitting a service to a mobile terminal according to one embodiment of the present invention.

FIG. 9 illustrates a block diagram of a UTRAN 620 according to one embodiment of the present invention. The UTRAN 620 includes one or more radio network sub-systems (RNS) 625. Each RNS 625 includes a radio network controller (RNC) 623 and a plurality of Node-Bs 621, or base stations, managed by the RNC. The RNC 623 handles the assignment and management of radio resources and operates as an access point with respect to the core network 4. Furthermore, the RNC 623 is adapted to perform the methods of the present invention.

The Node-Bs 621 receive information sent by the physical layer of a mobile terminal 500 through an uplink and transmit data to the terminal through a downlink. The Node-Bs 621 operate as access points, or as a transmitter and receiver, of the UTRAN 620 for the mobile terminal 500.

The Node-Bs 621 are adapted to transmit data to at least one mobile terminal 500 and to receive a measurement result parameter from the mobile terminal. The RNC 623 is adapted to transmit the data via a traffic channel and receive the measurement result parameter via a control channel, wherein the measurement result parameter is received in response to quality of service measurements of data received via the traffic channel.

The present invention allows an RRC-idle mode mobile terminal to inform a UTRAN of the reception quality state information or measurement results for a service currently provided to the mobile terminal via an uplink common control channel. Furthermore, the UTRAN is provided with the reception quality states or measurement results for a service provided to RRC-idle mode mobile terminals via an uplink common control channel, thereby facilitating more effective management of a radio bearer established in the cell in which the service is provided. The present invention facilitates securing a minimum quality for a service provided to RRC-idle mode UEs.

It will be apparent to one skilled in the art that the preferred embodiments of the present invention can be readily implemented using, for example, the processor 510 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

It will be apparent to those skilled in the art that various modifications and variations can be made in the present invention. Thus, it is intended that the present invention cover the modifications and variations of this invention provided they come within the scope of the appended claims and their equivalents.

What is claimed is:

1. A method of communicating quality of service information related to a point-to-multipoint service in a wireless communication system, the method comprising:
   a User Equipment (UE) in RRC (Radio Resource Control) idle mode receiving data of the point-to-multipoint service from a network via a common traffic channel when a point-to-multipoint radio bearer is established for the point-to-multipoint service;
   the UE in RRC idle mode measuring the quality of service of the received point-to-multipoint service during transmission of the point-to-multipoint service; and
   the UE in RRC idle mode transmitting a measurement result parameter to the network via a common control channel in response to measurement of the quality of service of the received point-to-multipoint service,
   wherein measuring the quality of service and transmitting the measurement result parameter are performed after the point-to-multipoint radio bearer is established for the point-to-multipoint service.

2. The method of claim 1, wherein the common traffic channel is a point-to-multipoint traffic channel.

3. The method of claim 1, further comprising the UE in RRC idle mode receiving a measurement request from the network to measure the quality of service of the received point-to-multipoint service.

4. The method of claim 3, wherein the measurement request comprises a measurement parameter comprising at least one of a measurement mode associated with a reporting period or a measurement object.

5. The method of claim 1, further comprising sustaining the RRC idle mode of the UE while performing the receiving, measuring and transmitting steps.

6. The method of claim 5, further comprising sustaining the RRC idle mode when there is no dedicated control signal link with the network.

7. The method of claim 1, wherein the measurement result parameter is transmitted at least on a periodic basis or in response to an event trigger.

8. The method of claim 7, wherein the event trigger comprises satisfying a condition set by the network.

9. The method of claim 1, wherein the measurement result parameter is transmitted to the network using an RRC connection request message.

10. The method of claim 9, wherein the RRC connection request message comprises a transmission cause indicating either that another service other than the point-to-multipoint service is desired or that no other service is desired.

11. The method of claim 1, wherein, the point-to-multipoint service is a packet data service different from a voice service.

12. A method of communicating quality of service information related to a point-to-multipoint service in a wireless communication system, the method comprising:
   transmitting the point-to-multipoint service via a common traffic channel to at least one mobile terminal in RRC (Radio Resource Control) idle mode when a point-to-multipoint radio bearer is established for the point-to-multipoint service; and
   receiving a measurement result parameter via a common control channel from the mobile terminal in RRC idle mode in response to measurement of the quality of service of the point-to-multipoint service,
   wherein the quality of service is measured during transmission of the point-to-multipoint service, and
   wherein measuring the quality of service and receiving the measurement result parameter are performed after the point-to-multipoint radio bearer is established for the point-to-multipoint service.

13. The method of claim 12, wherein the common traffic channel is a point-to-multipoint traffic channel.

14. The method of claim 12, further comprising transmitting a measurement request to the at least one mobile terminal in RRC idle mode to request measurement of the quality of service of the point-to-multipoint service.

15. The method of claim 14, wherein the measurement request comprises a measurement parameter comprising at least one of a measurement mode associated with a reporting period or a measurement object.

16. The method of claim 12, wherein the measurement result parameter is received at least on a periodic basis or in response to an event trigger.

17. The method of claim 16, wherein, the event trigger comprises a condition set by a network.

18. The method of claim 12, wherein the measurement result parameter is received from the at least one mobile terminal in RRC idle mode using a RRC connection request message.

19. The method of claim 18, wherein the RRC connection request message comprises a transmission cause indicating either that another service other than the point-to-multipoint service is desired or that no other service is desired, and further comprising:
processing the transmission cause received from the at least one mobile terminal in RRC idle mode; and
transmitting either a connection setup message for the service other than the point-to-multipoint service or a connection reject message.

20. The method of claim 12, wherein, the point-to-multipoint service is a packet data service different from a voice service.

21. A mobile communication device for communicating quality of service information related to a point-to-multipoint service in a wireless communication system, the mobile communication device comprising:
an RF module receiving the point-to-multipoint service from a network and transmitting a quality of service measurement result parameter to the network;
an antenna receiving the point-to-multipoint service from the network and transmitting the quality of service measurement result parameter to the network;
a keypad receiving information from a user;
a storage unit storing the quality of service measurement result parameter;
a display conveying information to the user; and
a processing unit receiving the point-to-multipoint service via a common traffic channel when a point-to-multipoint radio bearer is established for the point-to-multipoint service, measuring the quality of service of the point-to-multipoint service during transmission of the point-to-multipoint service in order to generate the quality of service measurement result parameter and transmitting the quality of service measurement result parameter to the network via a common control channel while the mobile communication device is in RRC (Radio Resource Control) idle mode,
wherein measuring the quality of service and transmitting the measurement result parameter are performed after the point-to-multipoint radio bearer is established for the point-to-multipoint service.

22. The mobile communication device of claim 21, wherein the common traffic channel is a point-to-multipoint traffic channel.

23. The mobile communication device of claim 21, wherein the processing unit further receives a measurement request from the network to measure the quality of service of the point-to-multipoint service, the measurement request comprising a measurement parameter.

24. The mobile communication device of claim 23, wherein the measurement parameter comprises at least one of a measurement mode associated with a reporting period or a measurement object.

25. The mobile communication device of claim 21, wherein the processing unit further transmits the quality of service measurement result parameter to the network at least on a periodic basis or in response to an event trigger.

26. The mobile communication device of claim 25, wherein the event trigger comprises satisfying a condition set by the network.

27. The mobile communication device of claim 21, wherein the processing unit further transmits the measurement result parameter to the network using an RRC connection request message.

28. The mobile communication device of claim 27, wherein the RRC connection request message comprises a transmission cause indicating either that another service other than the point-to-multipoint service is desired or that no other service is desired.

29. The mobile communication device of claim 21, wherein the processing unit of the mobile communication device in RRC idle mode further sustains the RRC idle mode while performing the receiving, measuring and transmitting steps.

30. The mobile communication device of claim 29 wherein the processing unit further sustains the RRC idle mode when there is no dedicated control signal link with the network.

31. The mobile communication device of claim 21, wherein, the point-to-multipoint service is a packet data service different from a voice service.

32. A network for communicating quality of service information related to a point-to-multipoint service in a wireless communication system, the network comprising:
a transmitter transmitting the point-to-multipoint service to at least one mobile terminal in RRC (Radio Resource Control) idle mode;
a receiver receiving a quality of service measurement result parameter from the at least one mobile terminal in RRC idle mode; and
a controller transmitting the point-to-multipoint service via a common traffic channel when a point-to-multipoint radio bearer is established for the point-to-multipoint service and receiving the measurement result parameter via a common control channel from the at least one mobile terminal in RRC idle mode, the quality of service measurement result parameter received in response to measurement of the quality of service of the point-to-multipoint service,
wherein the quality of service is measured during transmission of the point-to-multipoint service, and
wherein measuring the quality of service and receiving the measurement result parameter are performed after the point-to-multipoint radio bearer is established for the point-to-multipoint service.

33. The network of claim 32, wherein the common traffic channel is a point-to-multipoint traffic channel.

34. The network claim 32, wherein the controller further transmits a measurement request to the at least one mobile terminal in RRC idle mode to request measurement of the quality of service of the point-to-multipoint service.

35. The network claim 34, wherein the measurement request comprises a measurement parameter comprising at least one of a measurement mode associated with a reporting period or a measurement object.

36. The network claim 32, wherein the controller further receives the measurement result parameter from the at least one mobile terminal in RRC idle mode at least on a periodic basis or in response to an event trigger.

37. The network of claim 36, wherein the event trigger comprises a condition set by the network.

38. The network claim 32, wherein the controller further receives the measurement result parameter from the at least one mobile terminal in RRC idle mode using an RRC connection request message.

39. The network claim 38, wherein the RRC connection request message comprises a transmission cause indicating either that another service other than the point-to-multipoint service is desired or that no other service is desired, and the controller further processes the transmission cause received from the at least one mobile terminal in RRC idle mode and transmits either a connection setup message or a connection reject message.

40. The network of claim 32, wherein, the point-to-multipoint service is a packet data service different from a voice service.

* * * * *